United States Patent [19]
Chatterji et al.

[11] Patent Number: 6,098,711
[45] Date of Patent: Aug. 8, 2000

[54] COMPOSITIONS AND METHODS FOR SEALING PIPE IN WELL BORES

[75] Inventors: Jiten Chatterji, Duncan; Roger S. Cromwell, Walters; David D. Onan, Duncan; Bobby J. King, Duncan, all of Okla.

[73] Assignee: Halliburton Energy Services, Inc., Duncan, Okla.

[21] Appl. No.: 09/135,998

[22] Filed: Aug. 18, 1998

[51] Int. Cl.[7] .................................................. E21B 33/14
[52] U.S. Cl. ........................ 166/294; 166/292; 523/130
[58] Field of Search .................................. 166/285, 292, 166/293, 294, 295; 523/130, 131, 132

[56] References Cited

U.S. PATENT DOCUMENTS

| | | | |
|---|---|---|---|
| 2,815,079 | 12/1957 | Goins, Jr. et al. | 166/29 |
| 3,082,823 | 3/1963 | Hower | 166/29 |
| 3,208,525 | 9/1965 | Caldwell et al. | 166/33 |
| 3,310,111 | 3/1967 | Pavlich et al. | 166/33 |
| 3,416,604 | 12/1968 | Rensvold | 166/33 |
| 3,467,208 | 9/1969 | Kelly | 175/72 |
| 3,612,181 | 10/1971 | Brooks, Jr. | 166/295 |
| 3,750,768 | 8/1973 | Suman, Jr. et al. | 175/72 |
| 3,782,466 | 1/1974 | Lawson et al. | 166/254 |
| 3,894,977 | 7/1975 | Brown et al. | 260/18 EP |
| 3,933,204 | 1/1976 | Knapp | 166/295 |
| 3,960,801 | 6/1976 | Cole et al. | 260/33.6 |
| 3,976,135 | 8/1976 | Anderson | 166/276 |
| 4,042,031 | 8/1977 | Knapp | 166/276 |
| 4,042,032 | 8/1977 | Anderson et al. | 166/276 |
| 4,072,194 | 2/1978 | Cole et al. | 166/295 |
| 4,101,474 | 7/1978 | Copeland et al. | 260/13 |
| 4,113,015 | 9/1978 | Meijs | 166/295 |
| 4,127,173 | 11/1978 | Watkins et al. | 166/276 |
| 4,189,002 | 2/1980 | Martin | 166/295 |
| 4,199,484 | 4/1980 | Murphey | 260/13 |
| 4,215,001 | 7/1980 | Elphingstone et al. | 252/8.55 C |
| 4,216,829 | 8/1980 | Murphey | 166/276 |
| 4,220,566 | 9/1980 | Constien | 260/13 |
| 4,272,384 | 6/1981 | Martin | 252/8.55 R |
| 4,336,842 | 6/1982 | Graham et al. | 166/276 |
| 4,339,000 | 7/1982 | Cronmiller | 166/295 |
| 4,368,136 | 1/1983 | Murphey | 252/316 |
| 4,483,888 | 11/1984 | Wu | 427/336 |
| 4,489,785 | 12/1984 | Cole | 166/295 |
| 4,532,052 | 7/1985 | Weaver et al. | 252/8.55 R |
| 4,558,075 | 12/1985 | Suss et al. | 523/216 |
| 4,620,993 | 11/1986 | Suss et al. | 427/407.1 |
| 4,665,988 | 5/1987 | Murphey et al. | 166/295 |
| 4,741,401 | 5/1988 | Walles et al. | 166/300 |
| 4,773,482 | 9/1988 | Allison | 166/270 |
| 4,785,884 | 11/1988 | Armbruster | 166/280 |
| 4,829,100 | 5/1989 | Murphey et al. | 523/131 |
| 4,921,047 | 5/1990 | Summers | 166/276 |
| 4,972,906 | 11/1990 | McDaniel | 166/276 |
| 5,037,868 | 8/1991 | Saito et al. | 524/93 |
| 5,090,478 | 2/1992 | Summers | 166/278 |
| 5,095,987 | 3/1992 | Weaver et al. | 166/276 |
| 5,107,928 | 4/1992 | Hilterhaus | 166/293 |
| 5,133,409 | 7/1992 | Bour et al. | 166/293 |
| 5,159,980 | 11/1992 | Onan et al. | 166/294 |
| 5,168,928 | 12/1992 | Terry et al. | 166/292 |
| 5,211,234 | 5/1993 | Floyd | 166/276 |
| 5,213,161 | 5/1993 | King et al. | 166/293 |
| 5,232,961 | 8/1993 | Murphey et al. | 523/414 |
| 5,293,938 | 3/1994 | Onan et al. | 166/293 |
| 5,314,023 | 5/1994 | Dartez | 166/295 |
| 5,325,723 | 7/1994 | Meadows et al. | 73/794 |
| 5,335,726 | 8/1994 | Rodrigues | 166/295 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,363,918 | 11/1994 | Cowan et al. | 166/295 |
| 5,368,102 | 11/1994 | Dewprashad et al. | 166/276 |
| 5,373,901 | 12/1994 | Norman et al. | 166/300 |
| 5,377,757 | 1/1995 | Ng | 166/277 |
| 5,388,648 | 2/1995 | Jordan, Jr. | 166/380 |
| 5,428,178 | 6/1995 | Zuzich et al. | 549/378 |
| 5,458,195 | 10/1995 | Totten et al. | 166/293 |
| 5,547,027 | 8/1996 | Chan et al. | 166/295 |
| 5,559,086 | 9/1996 | Dewprashad et al. | 207/219 |
| 5,688,844 | 11/1997 | Chatterji et al. | 524/8 |
| 5,692,566 | 12/1997 | Surles | 166/295 |
| 5,738,463 | 4/1998 | Onan | 405/154 |
| 5,795,924 | 8/1998 | Chatterji et al. | 523/130 |
| 5,820,670 | 10/1998 | Chatterji et al. | 106/727 |
| 5,873,413 | 2/1999 | Chatterji et al. | 166/293 |
| 5,875,844 | 3/1999 | Chatterji et al. | 166/293 |
| 5,875,845 | 3/1999 | Chatterji et al. | 166/293 |
| 5,875,846 | 3/1999 | Chatterji et al. | 166/293 |
| 5,911,282 | 6/1999 | Onan et al. | 175/75 |
| 5,913,364 | 6/1999 | Sweatman | 166/281 |
| 5,945,387 | 8/1999 | Chatterji et al. | 507/224 |
| 5,957,204 | 9/1999 | Chatterji et al. | 166/295 |
| 5,969,006 | 10/1999 | Onan et al. | 523/166 |
| 6,006,835 | 12/1999 | Onan et al. | 166/295 |
| 6,006,836 | 12/1999 | Chatterji et al. | 166/295 |

FOREIGN PATENT DOCUMENTS

| | | | |
|---|---|---|---|
| 0 553 566 A1 | 8/1993 | European Pat. Off. | C12B 43/04 |
| 0619414A1 | 3/1994 | European Pat. Off. | E21B 33/16 |
| 0 802 253 A1 | 10/1997 | European Pat. Off. | C09K 7/02 |
| 1 315 462 | 12/1962 | France. | |
| 1315462 | 12/1962 | France. | |
| 01275454 | 11/1989 | Japan | C04B 28/02 |
| 1019122 | 2/1966 | United Kingdom | E02D 3/14 |
| 2247234 | 2/1992 | United Kingdom | C04B 24/00 |
| WO 91/02703 | 7/1991 | WIPO. | |
| WO 94/12445 | 9/1994 | WIPO. | |

*Primary Examiner*—Frank S. Tsay
*Attorney, Agent, or Firm*—Craig W. Roddy; C. Clark Dougherty, Jr.

[57] ABSTRACT

The present invention provides improved compositions and methods for sealing pipe in well bores. The compositions are basically comprised of an aqueous rubber latex, a rubber latex activator for causing the latex to harden, an organosilane and a filler.

30 Claims, No Drawings

6,098,711

COMPOSITIONS AND METHODS FOR SEALING PIPE IN WELL BORES

BACKGROUND OF THE INVENTION

1. Field of the Invention

The present invention relates generally to improved compositions and methods for sealing pipe in well bores, and more particularly, to such compositions and methods wherein the sealant hardens into a highly resilient solid mass having high bond strength.

2. Description of the Prior Art

Hydraulic cement compositions are commonly utilized as sealants in subterranean well construction and repair procedures. For example, hydraulic cement compositions are used in primary sealing operations whereby strings of pipe such as casing and liners are sealed in well bores. In performing primary cementing, a hydraulic cement composition is pumped into the annular space between the walls of the well bore and the exterior surfaces of pipe disposed therein. The cement composition is permitted to set in the annular space thereby forming an annular sheath of hardened substantially impermeable cement therein. The cement sheath is intended to support and position the pipe in the well bore and bond the exterior surfaces of the pipe to the walls of the well bore whereby the undesirable migration of fluids between zones or formations penetrated by the well bore is prevented.

Set hydraulic cement compositions are brittle solid masses which generally do not have sufficient resiliency to resist the loss of pipe and/or formation bond, cracking or shattering as a result of pipe movements caused by expansion, contraction, impacts or shocks. The bond loss, cracking or shattering of the set cement allows leakage of formation fluids through at least portions of the well bore by way of the annulus therein which can be highly detrimental.

Thus, there are needs for improved pipe sealing compositions and methods of sealing pipe in well bores whereby the hardened compositions are highly resilient solid masses having high bond strengths.

SUMMARY OF THE INVENTION

The present invention provides improved sealing compositions and methods which meet the needs described above and overcome the deficiencies of the prior art. The compositions of this invention harden into highly resilient solid masses having high bond strengths which are capable of withstanding the effects of pipe movements. The compositions are basically comprised of an aqueous rubber latex present in an amount in the range of from about 10% to about 90% by weight of the compositions, a rubber latex activator for causing the rubber latex to harden present in an amount in the range of from about 0.1% to about 5% by weight of the compositions, an organosilane compound for providing high bond strength to the compositions present in an amount in the range of from about 0.1% to about 1% by weight of the compositions and a filler present in an amount in the range of from about 10% to about 30% by weight of the compositions.

A preferred sealing composition of this invention is comprised of an aqueous rubber latex present in an amount in the range of from about 10% to about 40% by weight of the composition, a rubber latex activator present in an amount in the range of from about 0.1% to about 5% by weight of the composition, an organosilane present in an amount in the range of from about 0.1% to about 1% by weight of the composition, an aqueous rubber latex stabilizing surfactant present in an amount in the range of from about 1% to about 5% by weight of the composition, a hydraulic cement present in an amount in the range of from about 10% to about 40% by weight of the composition, an epoxy resin present in an amount in the range of from about 15% to about 30% by weight of the composition, an epoxide containing liquid present in an amount in the range of from about 2% to about 10% by weight of the composition, an epoxide hardening agent present in an amount in the range of from about 2% to about 10% by weight of the composition and a solid filler present in an amount in the range of from about 10% to about 30% by weight of the composition.

While the sealing compositions of this invention can be utilized for sealing non-rusted pipe in well bores, they are particularly effective for sealing the more typical rusted pipe utilized in well bores by the oil industry.

The methods of this invention are basically comprised of the steps of preparing a sealing composition of this invention which hardens into a highly resilient solid mass having a high bond strength, placing the sealing composition in the annulus between pipe and the walls of a well bore and then allowing the sealing composition to harden into a solid mass.

It is, therefore, a general object of the present invention to provide improved compositions and methods for sealing pipe in well bores.

Other and further objects, features and advantages of the present invention will be readily apparent to those skilled in the art upon a reading of the description of preferred embodiments which follows.

DESCRIPTION OF PREFERRED EMBODIMENTS

As mentioned, the present invention provides improved compositions and methods for sealing pipe in well bores whereby the hardened sealing composition is a highly resistant solid mass having high bond strength which effectively withstands pipe movements due to expansion, contraction, impacts, shocks or the like. The compositions of this invention are basically comprised of an aqueous rubber latex, a rubber latex activator for causing the rubber latex to harden, an organosilane compound for providing high bond strength to the composition and a filler for providing rigidity to the composition which can be a hydraulic cement and/or a particulate solid filler such as crystalline silica (sand).

A more preferred composition of this invention is comprised of an aqueous rubber latex, a rubber latex activator, an organosilane compound, a rubber latex stabilizing surfactant, a hydraulic cement such as calcium aluminate cement, an epoxy resin, an epoxide containing liquid, an epoxide hardening agent and a particulate solid filler.

A variety of well known rubber materials which are commercially available in aqueous latex form, i.e., aqueous dispersions or emulsions, can be utilized in accordance with the present invention. For example, natural rubber (cis-1,4-polyisoprene) and most of its modified types can be utilized.

Synthetic polymers of various types can also be used including nitrile rubber, ethylene-propylene rubbers (EPM and EPDM), styrene-butadiene rubber (SBR), nitrile-butadiene rubber (NBR), butyl rubber, neoprene rubber, cis-1,4-polybutadiene rubber and blends thereof with natural rubber or styrene-butadiene rubber, high styrene resin, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber and polysulfide rubber. The aqueous latex forms of one or more of the above rubbers can be utilized with the other components of the sealing composition being added directly to the latex.

Of the various aqueous rubber latexes which can be utilized, those formed of cis-polyisoprene rubber, nitrile rubber, ethylene-propylene rubber, styrene-butadiene rubber, nitrile-butadiene rubber, butyl rubber and neoprene rubber are generally preferred.

The most preferred aqueous rubber latex for use in accordance with this invention is a styrene-butadiene copolymer latex emulsion prepared by emulsion polymerization. The aqueous phase of the emulsion is an aqueous colloidal dispersion of the styrene-butadiene copolymer. The latex dispersion usually includes water in an amount in the range of from about 40% to about 70% by weight of the latex, and in addition to the dispersed styrene-butadiene particles, the latex often includes small quantities of an emulsifier, polymerization catalysts, chain modifying agents and the like. The weight ratio of styrene to butadiene in the latex can range from about 10%:90% to about 90%:10%.

Styrene-butadiene latexes are often commercially produced as terpolymer latexes which include up to about 3% by weight of a third monomer to assist in stabilizing the latex emulsions. The third monomer, when present, generally is anionic in character and includes a carboxylate, sulfate or sulfonate group. Other groups that may be present on the third monomer include phosphates, phosphonates or phenolics. Non-ionic groups which exhibit stearic effects and which contain long ethoxylate or hydrocarbon tails can also be present.

A particularly suitable and preferred styrene-butadiene aqueous latex contains water in an amount of about 50% by weight of the latex, and the weight ratio of styrene to butadiene in the latex is about 25%:75%. A latex of this type is available from Halliburton Energy Services of Duncan, Oklahoma, under the trade designation "LATEX 2000™."

The aqueous rubber latex utilized is generally included in the sealing compositions of this invention in an amount in the range of from about 10% to about 90% by weight of the compositions, preferably about 15% to about 40% and more preferably about 24%.

In order to cause the rubber latex to harden into a solid mass, a latex activator is included in the sealing composition. While various acids and other materials can be utilized as activators, particularly suitable rubber latex activators are metallic oxides such as zinc oxide, magnesium oxide and calcium oxide. Zinc oxide is the most preferred rubber latex activator for use in accordance with this invention.

The rubber latex activator is generally included in the sealing compositions of this invention in an amount in the range of from about 0.1% to about 5% by weight of the compositions, preferably about 0.4% to about 3% and more preferably about 5%.

Suitable organosilane compounds for providing high bond strengths to the sealing compositions of this invention include, but are not limited to, 3-aminopropyltrimethoxysilane, 3-aminopropyltriethoxysilane, 3-mercaptopropyltrimethoxysilane, N-2-(aminoethyl)-3-aminopropyltriethoxysilane and 3-glycidoxypropyltrimethoxysilane. Of these, N-2-(aminoethyl)-3-aminopropyltriethoxysilane is preferred.

The organosilane compound is generally included in the sealing compositions of this invention in an amount in the range of from about 0.01% to about 10% by weight of the sealing compositions, preferably about 0.1% to about 5% and more preferably about 0.25%.

In order to provide rigidity to the hardened sealing compositions, a filler such as hydraulic cement and/or a particulate solid such as crystalline silicas, amorphous silicas, clays, iron oxide, calcium carbonate or barite is included in the compositions. The filler is generally present in the compositions in an amount in the range of from about 10% to about 30% by weight of the compositions.

In order to prevent the aqueous latex from prematurely coagulating and increasing the viscosity of the sealing compositions, an effective amount of a rubber latex stabilizing surfactant can be included in the compositions. A suitable such surfactant has the formula

R—Ph—O (OCH$_2$CH$_2$)$_m$OH wherein R is an alkyl group having from about 5 to about 30 carbon atoms, Ph is phenyl and m is an integer in the range of from about 5 to about 50. A preferred surfactant in this group is ethoxylated nonylphenol containing in the range of from about 20 to about 30 moles of ethylene oxide.

Another latex stabilizing surfactant which can be used has the general formula

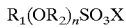

R$_1$(OR$_2$)$_n$SO$_3$X wherein R$_1$ is selected from the group consisting of alkyl groups having from 1 to about 30 carbon atoms, cycloalkyl groups having 5 or 6 carbon atoms, C$_1$–C$_4$ alkyl substituted cycloalkyl groups, phenyl, alkyl substituted phenol of the general formula

(R$_3$)$_a$Ph— wherein Ph is phenyl, R$_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms; R$_2$ is a substituted ethylene group of the formula

—CH$_2$CH$_2$R$_4$ wherein R$_4$ is selected from hydrogen, methyl, ethyl or mixtures thereof; n is a number from 0 to about 40 provided that when R$_1$ is phenyl or alkyl substituted phenyl, n is at least 1; and X is any compatible cation.

Another surfactant which can be utilized is a sodium salt having the general formula

wherein $R_5$ is an alkyl radical having in the range of from 1 to about 9 carbon atoms, $R_6$ is the group —$CH_2CH_2$—, o is an integer from about 10 to about 20 and X is a compatible cation. Another surfactant which can be utilized is a sodium salt having the formula

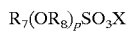

wherein $R_7$ is an alkyl group having in the range of from about 5 to about 20 carbon atoms, $R_8$ is the group —$CH_2CH_2$—, p is an integer in the range of from about 10 to about 40 and X is a compatible cation. A preferred surfactant of this type is the sodium salt of a sulfonated compound derived by reacting a $C_{12}$–$C_{15}$ alcohol with about 40 moles of ethylene oxide (hereinafter referred to as an "ethoxylated alcohol sulfonate") which is commercially available under the name "AVANEL S400™" from PPG Mazer, a division of PPG Industries, Inc. of Gurnee, Ill.

While different rubber latex stabilizers and amounts can be included in the sealing compositions of this invention depending on the particular aqueous rubber latex used and other factors, the latex stabilizer is usually included in the sealing compositions in an amount in the range of from about 10% to about 15% by weight of the aqueous rubber latex in the compositions, preferably from about 1% to about 5%, and more preferably about 2.5%.

When a hydraulic cement is utilized in the compositions of this invention, it can be Portland cement, calcium aluminate cement or other cement which does not adversely affect other components in the sealing compositions. Of the various hydraulic cements that can be used, calcium aluminate cement is preferred. When used, the hydraulic cement is generally present in the sealing compositions in an amount in the range of from about 10% to about 40% by weight of the composition, preferably from about 15% to about 30% and more preferably about 24%.

While various epoxy resins can be utilized, preferred such resins are those selected from the condensation products of epichlorohydrin and bisphenol A. A particularly suitable such resin is commercially available from the Shell Chemical Company under the trade designation "EPON®RESIN 828". This epoxy resin has a molecular weight of about 340 and a one gram equivalent of epoxide per about 180 to about 195 grams of resin. Preferably, the above described epoxy resin is pre-dispersed in a non-ionic aqueous fluid. A water borne resin of this type is commercially available from the Shell Chemical Company under the trade designation "EPI-REZ®-3510-W-60." Other water borne resins can also be utilized including, but not limited to, an epoxidized bisphenol A novalac resin which is pre-dispersed in a non-ionic aqueous fluid and is commercially available from the Shell Chemical Company under the trade designation "EPI-REZ®-5003-W-55." This epoxy resin has a one gram equivalent of epoxide per about 205 grams of resin.

When a water borne resin is utilized in the compositions of this invention, it is generally present in an amount in the range of from about 15% to about 30% by weight of the compositions, preferably from about 15% to about 25%, and more preferably about 19%.

A low viscosity epoxide containing liquid can also be utilized in the sealing compositions of the present invention to modify the epoxy resin used and to add flexibility and resiliency to the sealing composition after hardening. While various epoxide containing liquids can be used, preferred such liquids are the diglycidyl ether of 1,4-butanediol, the diglycidyl ether of neopentyl glycol and the diglycidyl ether of cyclohexane dimethanol. A suitable epoxide containing liquid comprised of the diglycidyl ether of 1,4-butanediol is commercially available from the Shell Chemical Company under the trade name "HELOXY®67." This epoxide containing liquid has a viscosity at 25° C. in the range of from about 13 to about 18 centipoises, a molecular weight of 202 and a one gram equivalent of epoxide per about 120 to about 130 grams of the liquid. A suitable diglycidyl ether of neopentylglycol is commercially available from the Shell Chemical Company under the trade name "HELOXY®68." This epoxide containing liquid has a viscosity at 25° C. in the range of from about 13 to about 18 centipoises, a molecular weight of 216 and a one gram equivalent of epoxide per about 130 to about 140 grams of the liquid. A suitable diglycidyl ether of cyclohexanedimethanol is commercially available from the Shell Chemical Company under the trade name "HELOXY®107." This epoxide containing liquid has a viscosity at 25° C. in the range of from about 55 to about 75 centipoises, a molecular weight of 256 and a one gram equivalent of epoxide per about 155 to about 165 grams of the liquid.

When an epoxide containing liquid is included in the sealing compositions of this invention, it is generally present in an amount in the range of from about 2% to about 10% by weight of the compositions, preferably from about 2% to about 6% and more preferably about 5%.

A variety of epoxide hardening agents can be utilized in the sealing compositions of this invention which contain the above described epoxide containing liquids and/or epoxy resins. Such hardening agents include, but are not limited to, aliphatic amines, aliphatic tertiary amines, aromatic amines, cycloaliphatic amines, heterocyclic amines, amidoamines, polyamides, polyethylamines and carboxylic acid anhydrides. Of these, aliphatic amines, aromatic amines and carboxylic acid anhydrides are the most suitable.

Examples of aliphatic and aromatic amine hardening agents are triethylenetetraamine, ethylenediamine, N-cocoalkyltrimethylenediamine, isophoronediamine, diethyltoluenediamine, and tris(dimethylaminomethylphenol). Examples of suitable carboxylic acid anhydrides are methyltetrahydrophthalic anhydride, hexahydrophthalic anhydride, maleic anhydride, polyazelaic polyanhydride and phthalic anhydride. Of these, triethylenetetraamine, ethylenediamine, N-cocoalkyltrimethylenediamine, isophoronediamine, diethyltoluenediamine and tris(dimethylaminomethylphenol) are preferred, with isophoronediamine, diethyletoluenediamine and tris(dimethylaminomethylphenol) being the most preferred.

When utilized, the above described hardening agents or mixtures of such agents are generally included in the sealing compositions of this invention in an amount in the range of from about 2% to about 10% by weight of the compositions, preferably from about 2% to about 6% and more preferably about 4.5%.

A preferred composition of this invention for sealing pipe in a well bore which hardens into a highly resilient solid mass having high bond strength is comprised of an aqueous rubber latex present in an amount in the range of from about 10% to about 90% by weight of the composition, a rubber latex activator for causing the rubber latex to harden present in an amount in the range of from about 0.1% to about 5% by weight of the composition, an organosilane compound present in an amount in the range of from about 0.1% to about 10% by weight of the composition and a filler present in an amount in the range of from about 10% to about 30% by weight of the composition.

The aqueous rubber latex is preferably selected from the group of cis-polyisoprene rubber, nitrile rubber, ethylenepropylene rubber, styrene-butadiene rubber, nitrile-butadiene rubber, butyl rubber and neoprene rubber. The most preferred aqueous rubber latex is an aqueous styrene-butadiene rubber latex. The rubber latex activator is preferably selected from the group of zinc oxide, magnesium oxide and calcium oxide. The most preferred latex activator is zinc oxide. The organosilane compound is preferably selected from 3-glycidoxypropyltrimethoxysilane, 3-aminopropyltriethoxysilane, N-2-(aminoethyl)-3-aminopropyltriethoxysilane and 3-glycidoxypropyltrimethoxysilane. The most preferred organosilane compound is N-2-(aminoethyl)-3-aminopropyltriethoxysilane. The filler can be a hydraulic cement and/or a particulate solid such as crystalline silica.

Another preferred sealing composition of this invention is comprised of an aqueous rubber latex, preferably an aqueous styrene-butadiene latex, present in an amount in the range of from about 10% to about 40% by weight of the composition; a rubber latex activator, preferably zinc oxide, present in an amount in the range of from about 0.1% to about 5% by weight of the composition; an organosilane, preferably N-2-(aminoethyl)-3-aminopropyltriethoxysilane, present in an amount in the range of from about 0.1% to about 10% by weight of the composition; an aqueous rubber latex stabilizing surfactant, preferably an ethoxylated alcohol sulfonate, present in an amount in the range of from about 10% to about 15% by weight of the aqueous rubber latex in the composition; a hydraulic cement, preferably calcium aluminate cement, present in an amount in the range of from about 10% to about 40% by weight of the composition; a water borne epoxy resin, preferably the condensation product of epichlorohydrin and bisphenol A dispersed in water, present in an amount in the range of from about 15% to about 30% by weight of the composition; an epoxide containing liquid, preferably the diglycidyl ether of 1,4 butanediol, present in an amount in the range of from about 2% to about 10% by weight of the composition; an epoxide hardening agent selected from the group of isophoronediamine, diethyltoluenediamine, tris (dimethylaminomethylphenol) and mixtures thereof present in an amount in the range of from about 2% to about 10% by weight of the composition; and a particulate crystalline silica filler present in an amount in the range of from about 10% to about 30% by weight of the composition.

A particularly preferred composition of this invention is comprised of an aqueous styrene-butadiene latex containing about 50% by weight water and a ratio of styrene to butadiene of 25%:75% by weight present in the composition in an amount of about 25% by weight of the composition, a zinc oxide rubber latex activator present in an amount of about 0.5% by weight of the composition, N-2-(aminoethyl-3-aminopropyltriethoxysilane present in an amount of about 0.25% by weight of the composition, an ethoxylated alcohol sulfonate latex stabilizing surfactant present in an amount of about 2.5% by weight of the composition, calcium aluminate cement present in an amount of about 25% by weight of the composition, the condensation product of epichlorohydrin and bisphenol A dispersed in water present in an amount of about 19% by weight of the composition, the diglycidyl ether of 1,4 butanediol present in an amount of about 5% by weight of the composition, diethyltolune diamine present in an amount of about 4.5% by weight of the composition, and a crystalline silica filler present in an amount of about 18.25% by weight of the composition.

The methods of the present invention are basically comprised of preparing a sealing composition of this invention which hardens into a highly resilient solid mass having a high bond strength, placing the sealing composition in the annulus between a pipe and the walls of a well bore, and allowing the sealing composition to harden into a solid mass.

In order to further illustrate the compositions and methods of the present invention, the following examples are given.

EXAMPLE 1

A rubber latex composition was prepared by mixing an aqueous styrene-butadiene latex (25% styrene:75% butadiene by weight containing 50% by weight water) with particulate crystalline silica and zinc oxide. The resulting composition was placed into the annulus of a pipe assembly, i.e., a small pipe centered inside a larger pipe. Prior to the tests the outer surface of the small pipe and inner surface of the larger pipe were sandblasted to remove rust. The rubber latex composition was cured at 140° F. for 72 hours. After curing, the shear bond strength of the composition was determined by supporting the larger pipe and applying force to the small inner pipe. The shear bond strength is the total force applied divided by the bonded surface area which breaks.

A second rubber latex composition was prepared by mixing the above described aqueous styrene-butadiene latex with particulate crystalline silica, zinc oxide, a latex stabilizing surfactant, i.e., an ethoxylated alcohol sulfonate and calcium aluminum cement. The resulting composition was placed in the annulus of a second pipe assembly of the type described above and the shear bond strength of the hardened composition was determined as described above. Also, the compressive strengths of portions of the hardened compositions were determined in accordance with the procedure set forth in *API Specification For Materials And Testing For Well Cements,* API Specification 10, 5th Edition dated Jul. 1, 1990 of the American Petroleum Institute.

The components and amounts of the components in the compositions and the results of the tests are set forth in Table I below.

TABLE I

Compressive and Clean Pipe Surface Shear Bond Strength Tests

| Sealing Composition No. | Sealing Composition Components | | | | | Shear Bond Strength[3], psi | Compressive Strength, psi |
|---|---|---|---|---|---|---|---|
| | Aqueous Rubber Latex[1], grams | Zinc Oxide, grams | Particulate Crystalline Silica, grams | Latex Stabilizer[2], grams | Calcium Aluminate Cement, grams | | |
| 1 | 350 | 6.5 | 325 | — | — | 0 | 32 |
| 2 | 300 | 6 | 225 | 15 | 75 | 0 | 71 |

[1]Aqueous styrene-butadiene latex (25% styrene:75% butadiene by wt. and containing 50% by wt. water).
[2]ethoxylated alcohol sulfonate
[3]Pipe assembly surfaces cleaned by sand blasting.

From Table I, it can be seen that the rubber latex compositions did not bond to the pipe assembly.

EXAMPLE 2

The shear bond tests described in Example 1 were repeated utilizing two sealing compositions of the present invention. The first composition was comprised of the aqueous styrene-butadiene latex described in Example 1, zinc oxide, particulate crystalline silica and an organosilane, i.e., 3-glycidoxypropyltrimethoxysilane. The second composition included the above described components and in addition, the latex stabilizing surfactant described in Example 1 and calcium aluminate cement. The components and the amounts of the components in the sealing compositions and the results of the tests are set forth in Table II below.

TABLE II

Clean Pipe Surface Shear Bond Strength Tests

| Sealing Composition No. | Sealing Composition Components | | | | | | Shear Bond Strength[4], psi |
|---|---|---|---|---|---|---|---|
| | Aqueous Rubber Latex[1], grams | Zinc Oxide, grams | Particulate Crystalline Silica, grams | Latex Stabilizer[2], grams | Calcium Aluminate Cement, grams | Organo-silane[3], psi | |
| 1 | 350 | 6.5 | 325 | — | — | 0.6 | 32 |
| 2 | 300 | 6 | 225 | 15 | 75 | 0.6 | 10.5 |

[a]Aqueous styrene-butadiene latex (25% styrene:75% butadiene by wt. and containing 50% by wt. water).
[2]ethoxylated alcohol sulfonate
[3]3-glycidoxypropyltrimethoxysilane
[4]Pipe assembly surfaces cleaned by sand blasting.

From Table II, it can be seen that the presence of the organosilane in the sealing compositions provided shear bond strength to the compositions.

EXAMPLE 3

Additional shear bond tests were conducted utilizing sealing compositions like those described in Example 2 except that different organosilanes were utilized in some of the compositions and the bonded surfaces of the pipe assemblies utilized were rusted. The components and quantities of the components utilized in the sealing compositions and the results of the tests are set forth in Table III below.

TABLE III

Rusted Pipe Surface Shear Bond Strength Tests

| Sealing Composition No. | Sealing Composition Components | | | | | | | | Shear Bond Strength[6], psi |
|---|---|---|---|---|---|---|---|---|---|
| | Aqueous Rubber Latex[1], grams | Zinc Oxide grams | Particulate Crystalline Silica, grams | Latex Stabilizer[2], grams | Calcium Aluminate Cement, grams | Organo-Silane[3], grams | Organo-Silane[4], grams | Organo-Silane[5], grams | |
| 1 | 350 | 6.5 | 325 | — | — | 0.6 | — | — | 31.5 |
| 2 | 300 | 6 | 225 | 15 | 75 | 0.6 | — | — | 46 |
| 3 | 350 | 6.5 | 325 | — | — | — | 0.6 | — | 5.2 |
| 4 | 300 | 6 | 225 | 15 | 75 | — | 0.6 | — | 10 |
| 5 | 350 | 6.5 | 325 | — | — | — | — | 0.6 | 6 |
| 6 | 300 | 6 | 225 | 15 | 75 | — | — | 0.6 | 8 |

[1]Aqueous styrene-butadiene latex (25% styrene:75% butadiene by wt. and containing 50% by wt. water).
[2]ethoxylated alcohol sulfonate
[3]3-glycidoxypropyltriethoxysilane
[4]3-mercaptopropyltrimethoxysilane
[5]3-glycidoxypropylmethyldiethoxysilane
[6]Pipe assembly surfaces rusted.

From Table III, it can be seen that higher shear bond strengths were obtained as a result of the pipe surfaces being rusted and that the alternate organosilanes tested were not as effective as the first organosilane, i.e., 3-glycidoxypropylthoxysilane.

EXAMPLE 4

Shear bond strength tests utilizing sand blasted pipe assemblies as well as compressive strength tests were conducted utilizing sealing compositions which instead of an organosilane included a water borne epoxy resin and an epoxide hardening agent. Some of the test compositions also included an epoxide containing liquid in addition to the water borne epoxy resin. The components and quantities of components in the sealing compositions and the results of the tests are given in Table IV below.

From Table IV, it can be seen that increased shear bond and compressive strengths were obtained as a result of the presence of the epoxide materials in the sealing compositions.

EXAMPLE 5

Additional tests like those described in Example 4 were conducted using sealing compositions similar to the compositions tested in Example 4 except that the compositions also included organosilanes. The components and quantities of components in the sealing compositions and the results of the tests are set forth in Table V below.

TABLE IV

Compressive And Clean Pipe Surface shear Bond Strength Tests

| Sealing Composition No. | Sealing Composition Components | | | | | | | | Shear Bond Strength[6], psi | Compressive Strength psi |
|---|---|---|---|---|---|---|---|---|---|---|
| | Aqueous Rubber Latex[1], grams | Zinc Oxide, grams | Particulate Crystalline Silica, grams | Latex Stabilizer[2], grams | Calcium Aluminate, grams | Water Borne Epoxy Resin[3], grams | Epoxide Containing Liquid[4], grams | Epoxide Hardening Agent[5], grams | | |
| 1 | 175 | 3.25 | 325 | — | — | 175 | — | 24.15 | 29.2 | 32 |
| 2 | 150 | 3 | 225 | 7.5 | 75 | 150 | — | 21 | 14 | 187 |
| 3 | 175 | 3.25 | 325 | — | — | 130 | 45 | 33 | 15 | 58.4 |
| 4 | 150 | 3 | 300 | 7.5 | 75 | 120 | 30 | 27 | 46 | 86 |
| 5 | 150 | 3 | 150 | 1.5 | 150 | 120 | 30 | 27 | 120 | 375 |

[1]Aqueous styrene-butadiene latex (25% styrene:75% butadiene by wt. and containing 50% by wt. water).
[2]ethoxylated alcohol sulfonate
[3]Condensation product of epichlorohydrin and bisphenol A dispersed in water available from Shell Chemical Co. under trade designation "EPI-REZ ® 3510W60"
[4]Diglycidyl ether of 1,4-butanediol
[5]Diethyltoluenediamine
[6]Pipe assembly surfaces cleaned by and blasting.

TABLE V

Compressive And Clean Pipe Surface Shear Bond Strength Tests

Sealing Composition Components

| Sealing Composition No. | Aqueous Rubber Latex[1], grams | Zinc Oxide, grams | Particulate Crystalline Silica, grams | Latex Stabilizer[2], grams | Calcium Aluminate, grams | Water Borne Epoxy Resin[3], grams | Epoxide Containing Liquid[4], grams | Epoxide Hardening Agent[5], grams | Organo-silane[6], grams | Organo-silane[7], grams | Shear Bond Strength[8], psi | Compressive Strength, psi |
|---|---|---|---|---|---|---|---|---|---|---|---|---|
| 1 | 150 | 3 | 225 | 7.5 | 75 | 150 | — | 21 | 0.5 | — | 19 | 200 |
| 2 | 150 | 3 | 225 | 7.5 | 75 | 150 | — | 21 | — | 0.5 | 43 | 215 |
| 3 | 175 | 3.25 | 325 | — | — | 130 | 45 | 33 | 0.875 | — | 20 | 228 |
| 4 | 150 | 3 | 300 | 15 | 75 | 120 | 30 | 27 | 0.6 | — | 59 | 136 |
| 5 | 175 | 3.25 | 325 | — | — | 130 | 45 | 33 | — | 0.875 | 50 | 106 |
| 6 | 150 | 3 | 300 | 15 | 75 | 120 | 30 | 27 | — | 0.6 | 187 | 80 |

[1]Aqueous styrene-butadiene latex (25% styrene:75% butadiene by wt. and containing 50% by wt. water).
[2]ethoxylated alcohol sulfonate
[3]Condensation product of epichlorohydrin and bisphenol A dispersed in water available from Shell Chemical Co. under trade designation "EPI-REZ ® 3510W60"
[4]Diglycidyl ether of 1,4-butanediol
[5]Diethyltoluenediamine
[6]3-glycidoxypropyltrimethoxysilane
[7]N-2-(aminoethyl)-3-aminopropyltrimethoxysilane
[8]Pipe assembly surfaces cleaned by sand blasting.

From Table V, it can be seen that the presence of both epoxide materials and organosilanes in the sealing compo-

TABLE VI

Rusted Pipe Surface Shear Bond Strength Tests

Sealing Composition Components

| Sealing Composition No. | Aqueous Rubber Latex[1], grams | Zinc Oxide, grams | Particulate Crystalline Silica, grams | Latex Stabilizer[2], grams | Calcium Aluminate, grams | Water Borne Epoxy Resin[3], grams | Epoxide Containing Liquid[4], grams | Epoxide Hardening Agent[5], grams | Organo-silane[6], grams | Organo-silane[7], grams | Organo-silane[8], grams | Organo-silane[9], grams | Shear Bond Strength[10], psi |
|---|---|---|---|---|---|---|---|---|---|---|---|---|---|
| 1 | 175 | 3.25 | 325 | — | — | 130 | 45 | 33 | 0.875 | — | — | — | 280 |
| 2 | 150 | 3 | 300 | 15 | 75 | 120 | 30 | 27 | 0.6 | — | — | — | 340 |
| 3 | 175 | 3.25 | 325 | — | — | 130 | 45 | 33 | — | 0.875 | — | — | 360 |
| 4 | 150 | 3 | 300 | 15 | 75 | 120 | 30 | 27 | — | 0.6 | — | — | 328 |
| 5 | 150 | 3 | 150 | 15 | 150 | 120 | 30 | 27 | 0.6 | — | — | — | 502 |
| 6 | 150 | 3 | 150 | 15 | 150 | 120 | 30 | 27 | — | 0.6 | — | — | 554 |
| 7 | 150 | 3 | 150 | 15 | 150 | 120 | 30 | 27 | — | — | 0.6 | — | 325 |
| 8 | 150 | 3 | 150 | 15 | 150 | 120 | 30 | 27 | — | — | — | 0.6 | 380 |

[1]Aqueous styrene-butadiene latex (25% styrene:75% butadiene by wt. and containing 50% by wt. water).
[2]ethoxylated alcohol sulfonate
[3]Condensation product of epichlorohydrin and bisphenol A dispersed in water available from Shell Chemical Co. under trade designation "EPI-REZ ® 3510W60"
[4]Diglycidyl ether of 1,4-butanediol
[5]Diethyltoluenediamine
[6]3-glycidoxypropyltrimethoxysilane
[7]N-2-(aminoethyl)-3-aminopropyltrimethoxysilane
[8]3-mercaptopropyltrimethoxysilane
[9]3-glycidoxypropylmethyldiethoxysilane
[10]Pipe assembly surfaces rusted.

sitions improved both the shear bond strengths and compressive strengths of the compositions.

EXAMPLE 6

Additional sealing compositions which were similar to those of Example 5 were prepared except that two different organosilanes were included in two of the test compositions and the surfaces of the shear bond pipe assemblies used were rusted. The components and quantities of the components in the sealing compositions and the test results are set forth in Table VI below.

From Table VI, it can be seen that the sealing compositions of this invention produced excellent shear bond strengths in rusted pipe.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved composition for sealing pipe in a well bore which hardens into a highly resilient solid mass having high bond strength comprising:
   an aqueous rubber latex present in an amount in the range of from about 10% to about 90% by weight of said composition;
   a rubber latex activator for causing said rubber latex to harden present in an amount in the range of from about 0.1% to about 5% by weight of said composition;
   an organosilane compound present in an amount in the range of from about 0.1% to about 10% by weight of said composition; and
   a filler present in an amount in the range of from about 10% to about 30% by weight of said composition.

2. The composition of claim 1 wherein said aqueous rubber latex is selected from the group of cis-polyisoprene rubber, nitrile rubber, ethylene-propylene rubber, styrene-butadiene rubber, nitrile-butadiene rubber, butyl rubber and neoprene rubber.

3. The composition of claim 1 wherein said aqueous rubber latex is an aqueous styrene-butadiene latex.

4. The composition of claim 3 wherein said aqueous styrene-butadiene latex contains water in the amount of about 50% by weight of said latex and the weight ratio of styrene to butadiene in said latex is about 25%:75%.

5. The composition of claim 1 wherein said rubber latex activator is selected from the group of zinc oxide, magnesium oxide and calcium oxide.

6. The composition of claim 1 wherein said organosilane compound is selected from the group of 3-aminopropyltrimethoxysilane, 3-aminopropyltriethoxysilane, N-2-(aminoethyl)-3-aminopropyltriethoxysilane and 3-glycidoxypropyltrimethoxysilane.

7. The composition of claim 1 wherein said filler is selected from the group of hydraulic cement, crystalline silicas, amorphous silicas, clays, iron oxide, calcium carbonate and barite.

8. The composition of claim 1 which further comprises an effective amount of an aqueous rubber latex stabilizing surfactant.

9. The composition of claim 8 wherein said aqueous rubber latex stabilizing surfactant is a sulfonated ethoxylated alcohol.

10. The composition of claim 1 which further comprises a hydraulic cement.

11. The composition of claim 10 wherein said hydraulic cement is calcium aluminate.

12. The composition of claim 1 which further comprises an epoxy resin and an epoxy resin hardening agent.

13. The composition of claim 12 wherein said epoxy resin is comprised of the condensation product of epichlorohydrin and bisphenol A dispersed in a non-ionic aqueous fluid.

14. The composition of claim 12 wherein said hardening agent is at least one member selected from the group of aliphatic amines, aromatic amines and carboxylic acid anhydrides.

15. The composition of claim 1 which further comprises an epoxide containing liquid.

16. The composition of claim 15 wherein said epoxide containing liquid is selected from the group of the diglycidyl ether of 1,4-butanediol, the diglycidyl ether of neopentyl glycol and the diglycidyl ether of cyclohexane dimethanol.

17. An improved composition for sealing pipe in a well bore which hardens into a highly resilient solid mass having high bond strength comprising:
   an aqueous styrene-butadiene latex which contains water in an amount of about 50% by weight of said latex and the weight ratio of styrene to butadiene in said latex is about 25%:75%, said latex being present in an amount in the range of from about 10% to about 40% by weight of said composition;
   a latex activator comprising zinc oxide present in an amount in the range of from about 0.1% to about 5% by weight of said composition;
   an organosilane comprising N-2-(aminoethyl)-3-aminopropyltrimethoxysilane present in an amount in the range of from about 0.1% to about 10% by weight of said composition;
   a latex stabilizer comprising an ethoxylated alcohol sulfonate present in an amount in the range of from about 10% to about 15% by weight of said composition;
   calcium aluminate cement present in an amount in the range of from about 10% to about 40% by weight of said composition;
   an epoxy resin comprising the condensation product of epichlorohydrin and bisphenol A dispersed in a non-ionic aqueous fluid present in an amount in the range of from about 15% to about 30% by weight of said composition;
   an epoxide containing liquid comprising the diglycidyl ether of 1,4-butanediol present in an amount in the range of from about 2% to about 10% by weight of said composition;
   an epoxide hardening agent comprising diethyl-toluenediamine present in an amount in the range of from about 2% to about 10% by weight of said composition; and
   a particulate solid filler present in an amount in the range of from about 10% to about 30% by weight of said composition.

18. A method of sealing pipe in a well bore comprising the steps of:
   (a) preparing a sealing composition which hardens into a highly resilient solid mass having high bond strength comprised of an aqueous rubber latex, a rubber latex hardening activator, an organosilane and a filler;
   (b) placing said sealing composition in the annulus between said pipe and the walls of said well bore; and
   (c) allowing said sealing composition to harden into a solid mass.

19. The method of claim 18 wherein said aqueous rubber latex is selected from the group of cis-polyisoprene rubber, nitrile rubber, ethylene-propylene rubber, styrene-butadiene rubber, nitrile-butadiene rubber, butyl rubber and neoprene rubber, and is present in an amount in the range of from about 10% to about 10% by weight of said composition.

20. The method of claim 19 wherein said aqueous rubber latex is an aqueous styrene-butadiene latex which contains water in an amount of about 50% by weight of said latex and the weight ratio of styrene to butadiene in said latex is about 25%:75%.

21. The method of claim 18 wherein said rubber latex activator is selected from the group of zinc oxide, magnesium oxide and calcium oxide, and is present in an amount in the range of from about 0.1% to about 5% by weight of said composition.

22. The method of claim 18 wherein said organosilane compound is selected from the group of 3-aminopropyltrimethoxysilane, 3-aminopropyltriethoxysilane, N-2-(aminoethyl)-3-aminopropyltrimethoxysilane and 3-glycidoxypropyltrimethoxysilane, and is present in an amount in the range of from about 0.1% to about 10% by weight of said composition.

23. The method of claim 18 wherein said filler is selected from the group of hydraulic cement, crystalline silicas, amorphous silicas, clays, iron oxide, calcium carbonate and barite and is present in an amount in the range of from about 10% to about 30% by weight of said composition.

24. The method of claim 18 wherein said composition further comprises an ethoxylated alcohol sulfonate aqueous rubber latex stabilizing surfactant present in an amount in the range of from about 10% to about 15% by weight of said aqueous rubber latex in said composition.

25. The method of claim 18 wherein said composition further comprises a hydraulic cement present in an amount in the range of from about 10% to about 40% by weight of said composition.

26. The method of claim 18 wherein said composition further comprises an epoxy resin present in an amount in the range of from about 15% to about 30% by weight of said composition and an epoxy resin hardening agent present in an amount in the range of from about 2% to about 10% by weight of said composition.

27. The method of claim 26 wherein said epoxy resin is comprised of the condensation product of epichlorohydrin and bisphenol A dispersed in a non-ionic aqueous fluid.

28. The method of claim 26 wherein said hardening agent is at least one member selected from the group of aliphatic amines, aromatic amines and carboxylic acid anhydrides.

29. The method of claim 26 wherein said composition further comprises an epoxide containing liquid present in an amount in the range of from about 2% to about 10% by weight of said composition.

30. The method of claim 29 wherein said epoxide containing liquid is selected from the group of the diglycidyl ether of 1,4 butanediol, the diglycidyl ether of neopentyl glycol and the diglycidyl ether of cyclohexane dimethanol.

* * * * *